US009387939B2

(12) United States Patent
Lundgren

(10) Patent No.: US 9,387,939 B2
(45) Date of Patent: Jul. 12, 2016

(54) VTOL_TWIN_PROPELLER_ATTITUDE_CONTROL_AIR_VEHICLE

(71) Applicant: Gert Magnus Lundgren, Chula Vista, CA (US)

(72) Inventor: Gert Magnus Lundgren, Chula Vista, CA (US)

(73) Assignee: LAPCAD Engineering, Inc., San Diego, CA (US)

( * ) Notice: Subject to any disclaimer, the term of this patent is extended or adjusted under 35 U.S.C. 154(b) by 0 days.

(21) Appl. No.: 13/723,144

(22) Filed: Dec. 20, 2012

(65) Prior Publication Data

US 2014/0175214 A1   Jun. 26, 2014

(51) Int. Cl.
| B64C 27/08 | (2006.01) |
| B64D 47/08 | (2006.01) |
| B64C 29/00 | (2006.01) |
| B64C 39/02 | (2006.01) |

(52) U.S. Cl.
CPC ............ B64D 47/08 (2013.01); B64C 29/0033 (2013.01); B64C 39/024 (2013.01); B64C 2201/027 (2013.01); B64C 2201/108 (2013.01); B64C 2201/126 (2013.01); B64C 2201/127 (2013.01)

(58) Field of Classification Search
USPC ................ 244/17.23, 17.11, 17.19, 54, 53 R; 701/2, 3, 4, 22
See application file for complete search history.

(56) References Cited

U.S. PATENT DOCUMENTS

| 1,754,192 | A | * | 4/1930 | Van Vliet | ............... | B64D 35/08 |
| | | | | | | 123/196 R |
| 3,332,404 | A | * | 7/1967 | Lovercheck | ............ | F02B 61/04 |
| | | | | | | 123/195 R |
| 3,985,320 | A | * | 10/1976 | Brady | ..................... | B64C 17/06 |
| | | | | | | 114/124 |
| 6,164,590 | A | * | 12/2000 | Kusic | ..................... | B64C 27/08 |
| | | | | | | 244/120 |
| 6,171,055 | B1 | * | 1/2001 | Vos | .......................... | F02C 9/44 |
| | | | | | | 416/1 |
| 6,609,378 | B2 | * | 8/2003 | Scott | ........................ | F02C 9/40 |
| | | | | | | 60/39.281 |
| 7,150,429 | B2 | * | 12/2006 | Kusic | ..................... | B64C 27/08 |
| | | | | | | 244/17.23 |
| 7,306,186 | B2 | * | 12/2007 | Kusic | ..................... | B64C 27/08 |
| | | | | | | 244/17.23 |
| 7,472,863 | B2 | * | 1/2009 | Pak | ........................ | A63H 27/14 |
| | | | | | | 244/12.5 |
| 7,584,923 | B2 | * | 9/2009 | Burrage | .................. | B64C 39/04 |
| | | | | | | 244/17.23 |
| 7,857,254 | B2 | * | 12/2010 | Parks | ...................... | B64C 15/00 |
| | | | | | | 244/12.4 |

(Continued)

Primary Examiner — Medhat Badawi
(74) Attorney, Agent, or Firm — Gert M. Lundgren

(57) ABSTRACT

A commonly assumed operational requirement for a multi-rotor vehicle, often referred to as a "Quad-Copter" or "Quad-Rotor", is to have onboard a minimum of three motors, in order to provide a stable hover, and more frequently as many as eight motors. The Twin Propeller Attitude Control (TPAC) Air Vehicle, using a hybrid control system, needs only two motors, in order to achieve full control of altitude, pitch, roll and yaw. Pitch control is achieved by means of differential thrust, while roll and yaw control is accomplished via thrust vectoring. In the event of loss power of one or both engines, a parachute will be automatically released.

5 Claims, 16 Drawing Sheets

(56) References Cited

U.S. PATENT DOCUMENTS

| | | | | |
|---|---|---|---|---|
| 8,152,096 B2* | 4/2012 | Smith | ................ | B64C 29/0033 244/12.4 |
| 8,453,962 B2* | 6/2013 | Shaw | ................ | B64C 27/20 244/12.4 |
| 8,646,720 B2* | 2/2014 | Shaw | ................ | B64C 27/20 244/17.23 |
| 2002/0100835 A1* | 8/2002 | Kusic | ................ | B64C 27/08 244/17.23 |
| 2006/0027701 A1* | 2/2006 | Eglin | ................ | B64C 27/001 244/17.11 |
| 2007/0034735 A1* | 2/2007 | Kusic | ................ | B64C 27/08 244/17.23 |
| 2007/0181742 A1* | 8/2007 | Van de Rostyne | ..... | A63H 27/02 244/17.23 |
| 2008/0006739 A1* | 1/2008 | Mochida | ................ | B64C 27/04 244/60 |
| 2008/0048065 A1* | 2/2008 | Kuntz | ................ | A63H 17/00 244/17.23 |
| 2009/0008499 A1* | 1/2009 | Shaw | ................ | B64C 27/20 244/17.23 |
| 2009/0230235 A1* | 9/2009 | McNulty | ................ | B64C 1/00 244/17.23 |
| 2010/0072318 A1* | 3/2010 | Westenberger | ........ | B64D 27/02 244/54 |
| 2010/0264256 A1* | 10/2010 | Yim | ................ | B64C 27/20 244/17.23 |
| 2010/0301168 A1* | 12/2010 | Raposo | ................ | A63H 23/00 244/171.2 |
| 2011/0001020 A1* | 1/2011 | Forgac | ................ | B64C 29/0033 244/7 A |
| 2013/0062455 A1* | 3/2013 | Lugg | ................ | B64C 29/0025 244/12.3 |
| 2014/0008485 A1* | 1/2014 | Lundgren | ................ | B64C 39/024 244/17.13 |
| 2014/0034775 A1* | 2/2014 | Hutson | ................ | B64C 39/024 244/17.17 |
| 2014/0061376 A1* | 3/2014 | Fisher | ................ | B60K 1/00 244/62 |

* cited by examiner

VTOL_TWIN_PROPELLER_ATTITUDE_CONTROL_AIR_VEHICLE

TECHNICAL FIELD

The present invention relates generally to Vertical Take-off and Landing Hover Vehicles, and more particularly to a Twin Propeller Attitude Control (TPAC) Air Vehicle, used as a camera platform, or deployed in other surveillance activities.

BACKGROUND OF THE INVENTION

Vertical Take-off and Landing Hover Vehicles are flying machines intended for use in reconnaissance and aerial photography. These types of vehicles are characterized by their capability to quickly climb to a predetermined location, then stay at that position while performing its function, or provide streaming video while travelling in a selected direction. Configurations have included the quad rotor Shrike by AeroVironment, and the T-Hawk by Honeywell.

From the foregoing it will be apparent that by using only two electric or gas powered engines, cost and complexity can be minimized. Further, it will be apparent that by enclosing the vehicle with a simple frame, safety can be increased when operating near or inside buildings. It will also be apparent that by dividing the frame into a few major components, the vehicle can be assembled and disassembled in the field.

The Twin Propeller Attitude Control Air Vehicle invention described in the following, has been reduced to practise, via a prototype that has performed repeatedly as predicted, both indoors and outdoors.

SUMMARY OF THE INVENTION

In a preferred embodiment, counter-rotating propellers are employed on a Twin Propeller Attitude Control Air Vehicle, that does not require a transmission to create the counter rotation of the individual propellers. In vertical hover mode, loss of one or both engines will trigger the launch of a parachute, in order to provide for a survivable descent.

In one embodiment of the invention, a vehicle employs two engine assemblies with a pair of inline counter-rotating propellers and a pair of inline counter-rotating engines, where each engine/propeller is individually controllable and physically independent thus no transmission connecting the two engines is involved.

In another embodiment, the engine assemblies are mounted such that the engine assemblies (and their respective thrust lines) are rotatable about the longitudinal axis of the vehicle, providing the ability to direct thrust downward and to the right or downward and to the left. This arrangement eliminates the need for a complex collective and cyclic blade pitch assembly.

In another embodiment of the present invention, the relative speed of the counter-rotating engines is varied to control pitch during the vertical hover mode. In this case, under normal operating conditions, both engines turn at the same speed and the thrust produced by the first engine and propeller is equal to the thrust produced by the second engine and propeller, thus keeping the vehicle level around the lateral axis. When the speed of one engine is increased and the speed of the other engine is decreased by the same amount, the resulting non-zero net torque around the lateral axis results in pitching of the vehicle with no net change in the thrust produced by the pair of propellers. With this arrangement, there is no need for additional control surfaces situated in the downwash of the propellers, in order to control pitch. A further embodiment includes electric motors as an alternative to internal combustion engines, to drive the propellers. This provides for easier control of relative motor speed and provides quicker pitch response.

Another embodiment of the present invention is an automatic feedback control mechanism for stabilizing hover characteristics of the vehicle.

Other aspects and advantages of the present invention will become apparent from the following detailed description, taken in conjunction with the accompanying drawings, illustrating the principles of the invention.

DETAILED DESCRIPTION OF THE INVENTION

Figure 1:
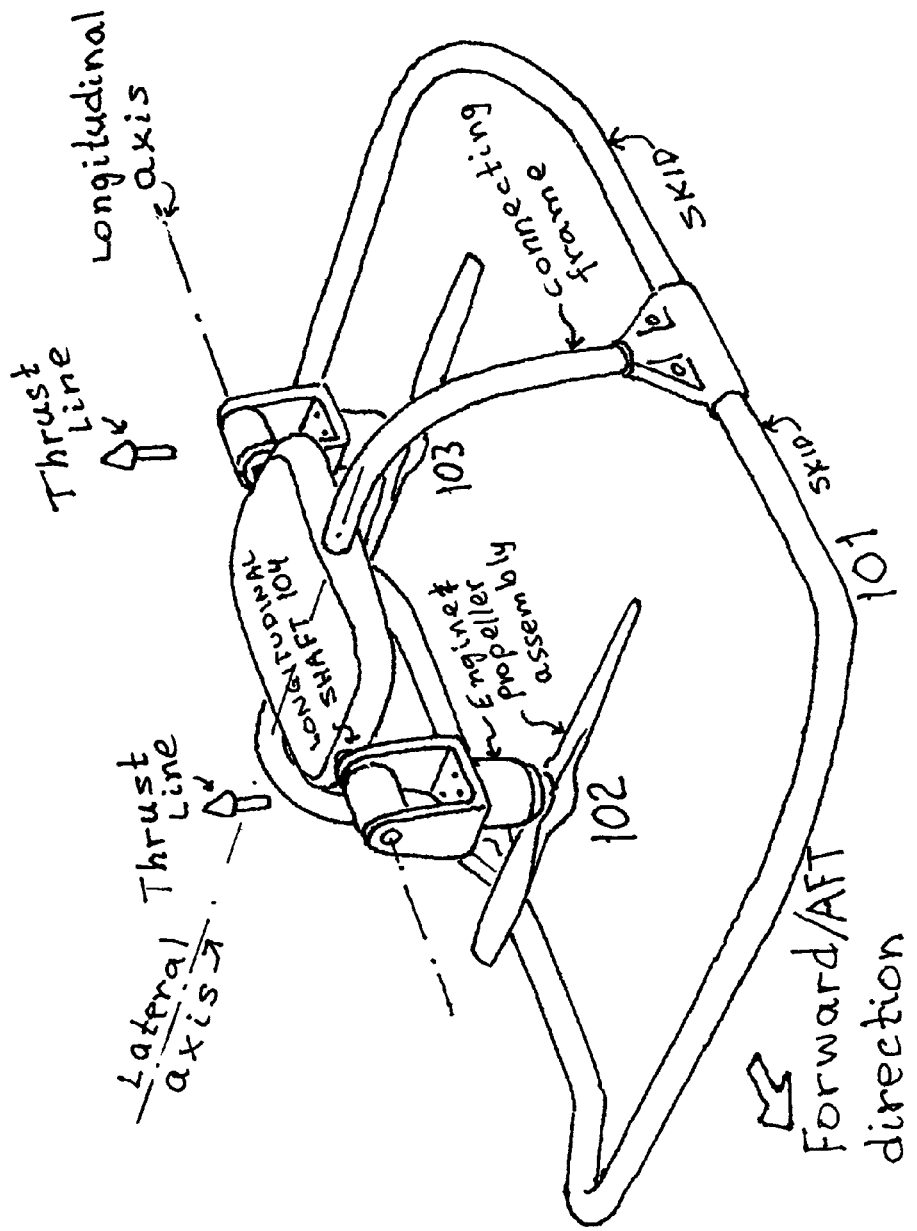
FIGS. 1, 2, 3, and 4, show the vehicle in perspective views, from the front, from the rear, from the side, and aftward, respectively.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

DETAILED DESCRIPTION

The drawings show for purposes of illustration, a Twin Propeller Attitude Control Air Vehicle with VTOL capability. It utilizes two engine assemblies, tiltable around the vehicle longitudinal axis. The two counter-rotating propellers are driven by individual electric, turboprop or piston engines. This provides for a simplified mechanism that does not require a transmission to create the counter-rotation of the propellers. By mounting the engine assemblies in such a way that they can be rotated about the longitudinal axis, and by independently controlling the power of each engine, a simplified flight control system for vertical hover mode may be achieved. In an additional embodiment, a simplified flight stabilization system is applied to the flight control system and a hybrid control system, the hybrid control system controls unequal or differential thrust and thrust vectoring of the engines. Also, in another embodiment, the flight control system is operated by remote control.

Figure 2:
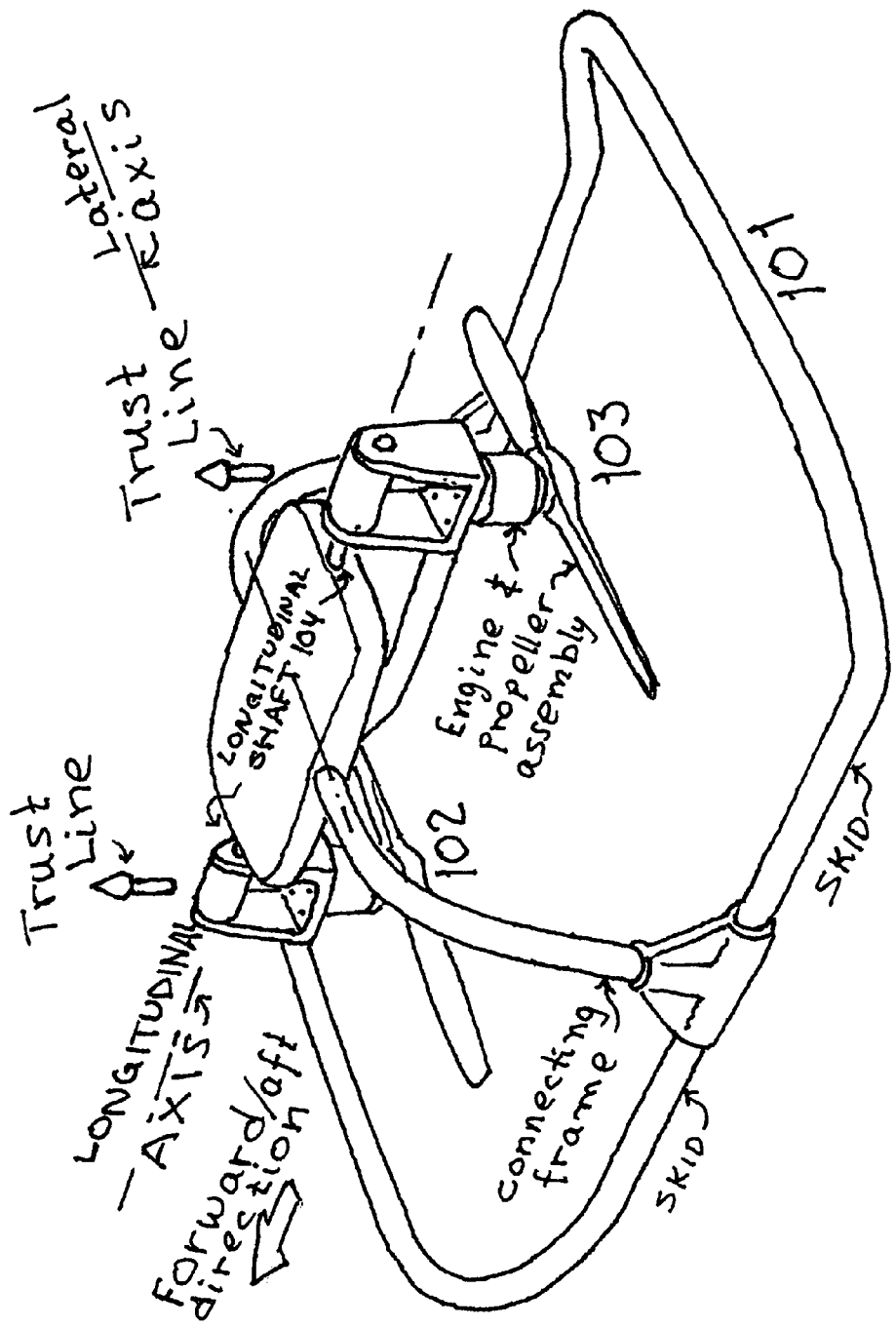
Figure 3:
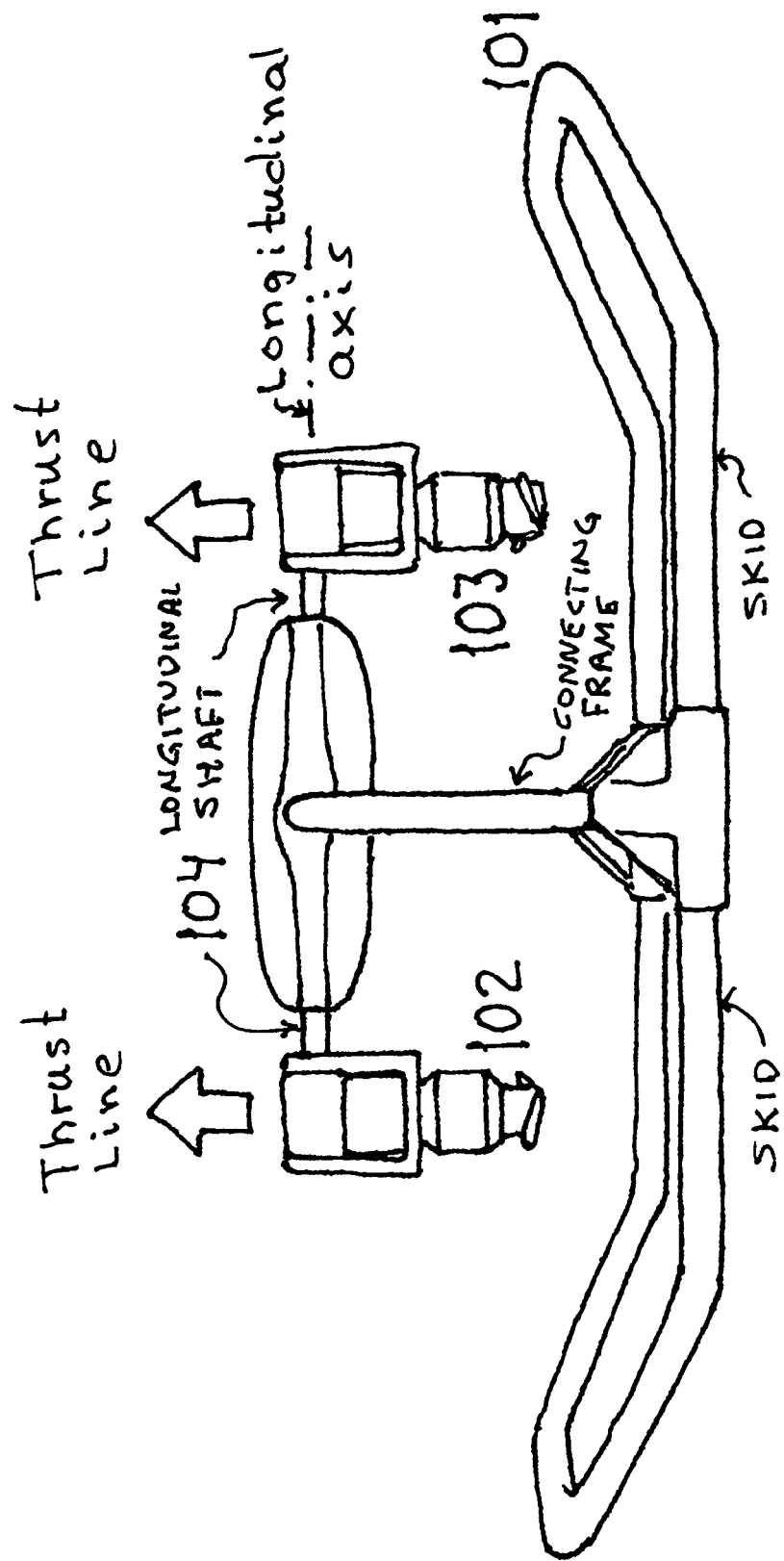
Figure 4:
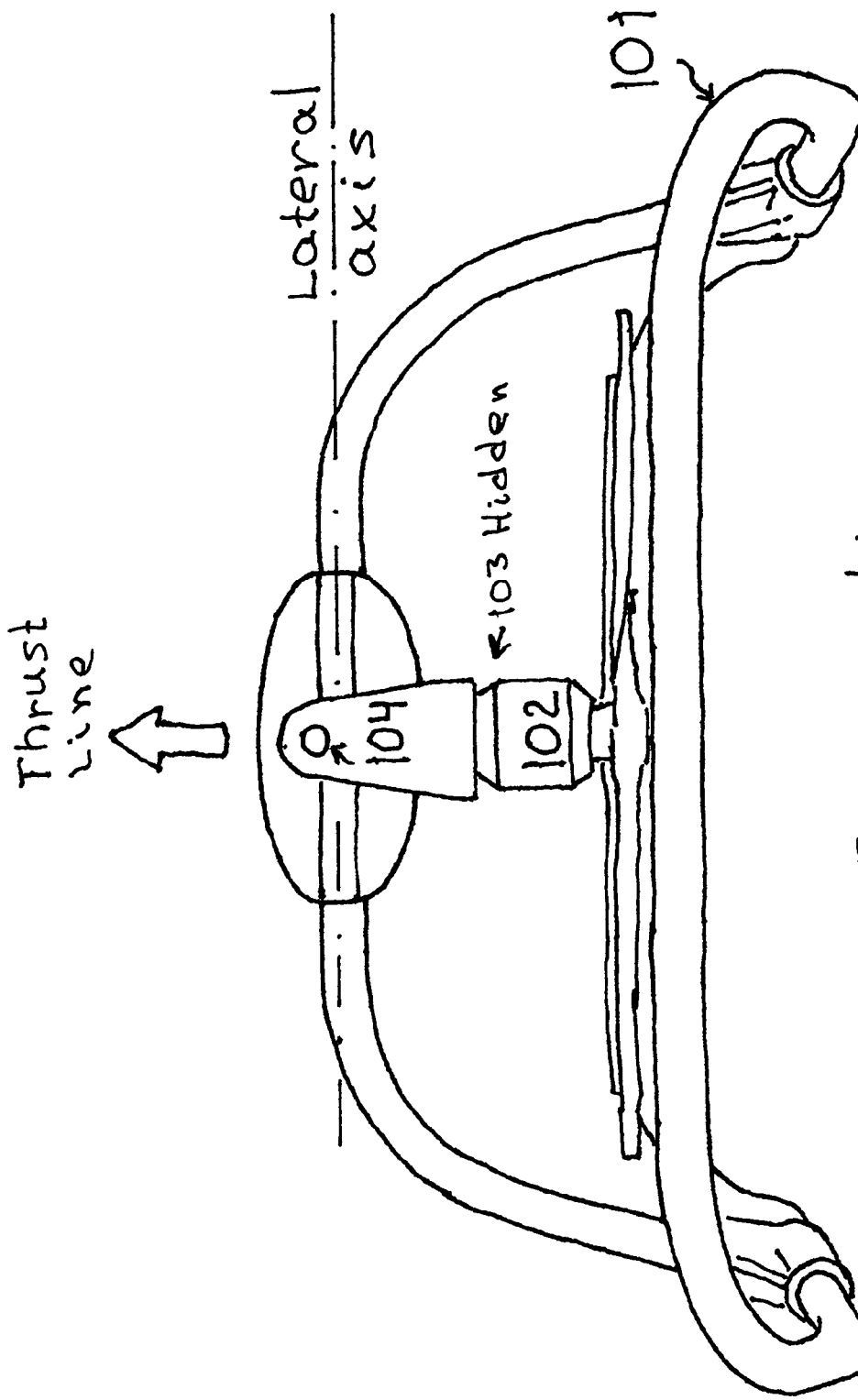
Figure 5:
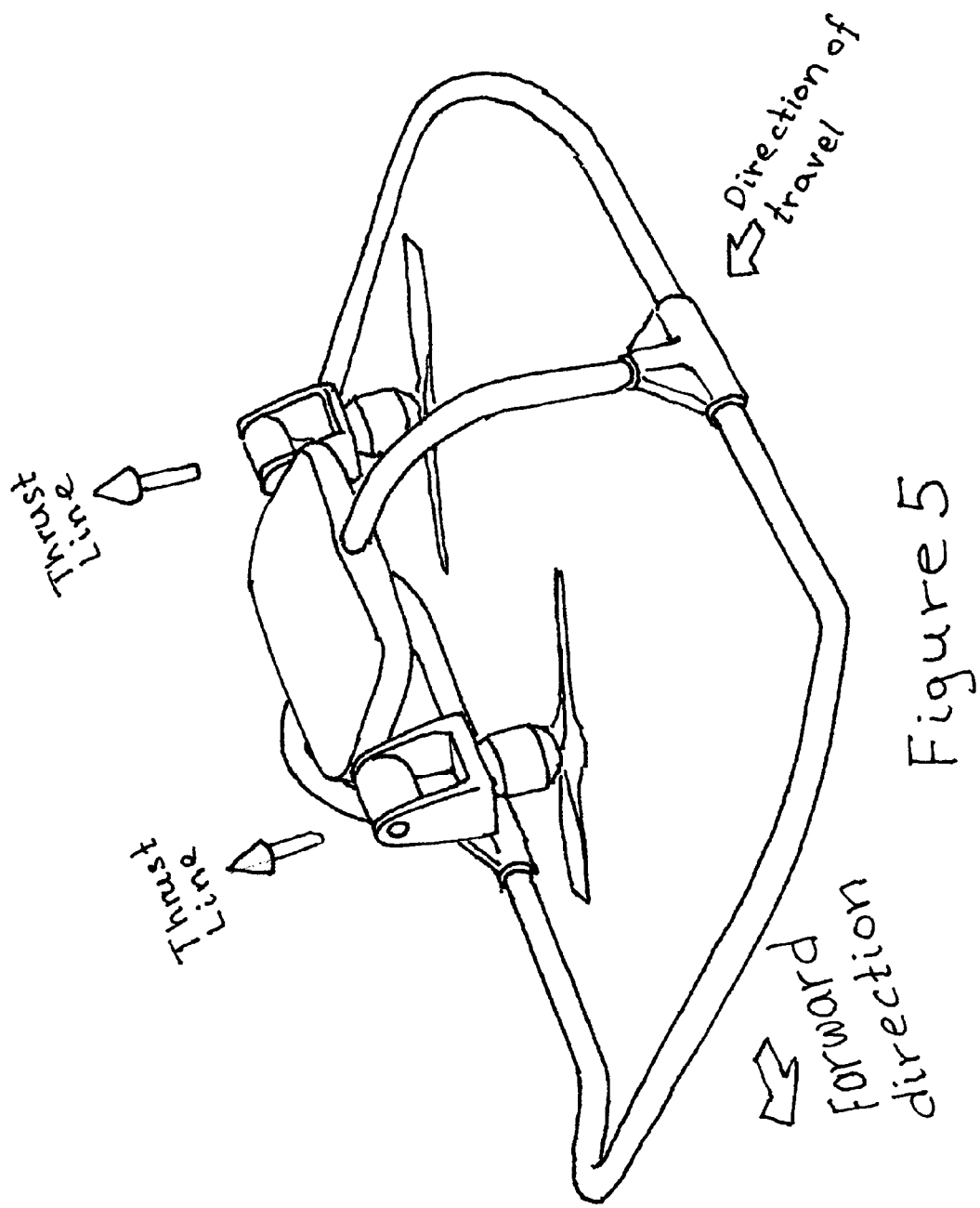
FIGS. 5 and 6 show both engine assemblies tilted around the longitudinal axis, to the left (looking forward), resulting in a lateral force being imposed on the vehicle in the right direction.
Figure 6:
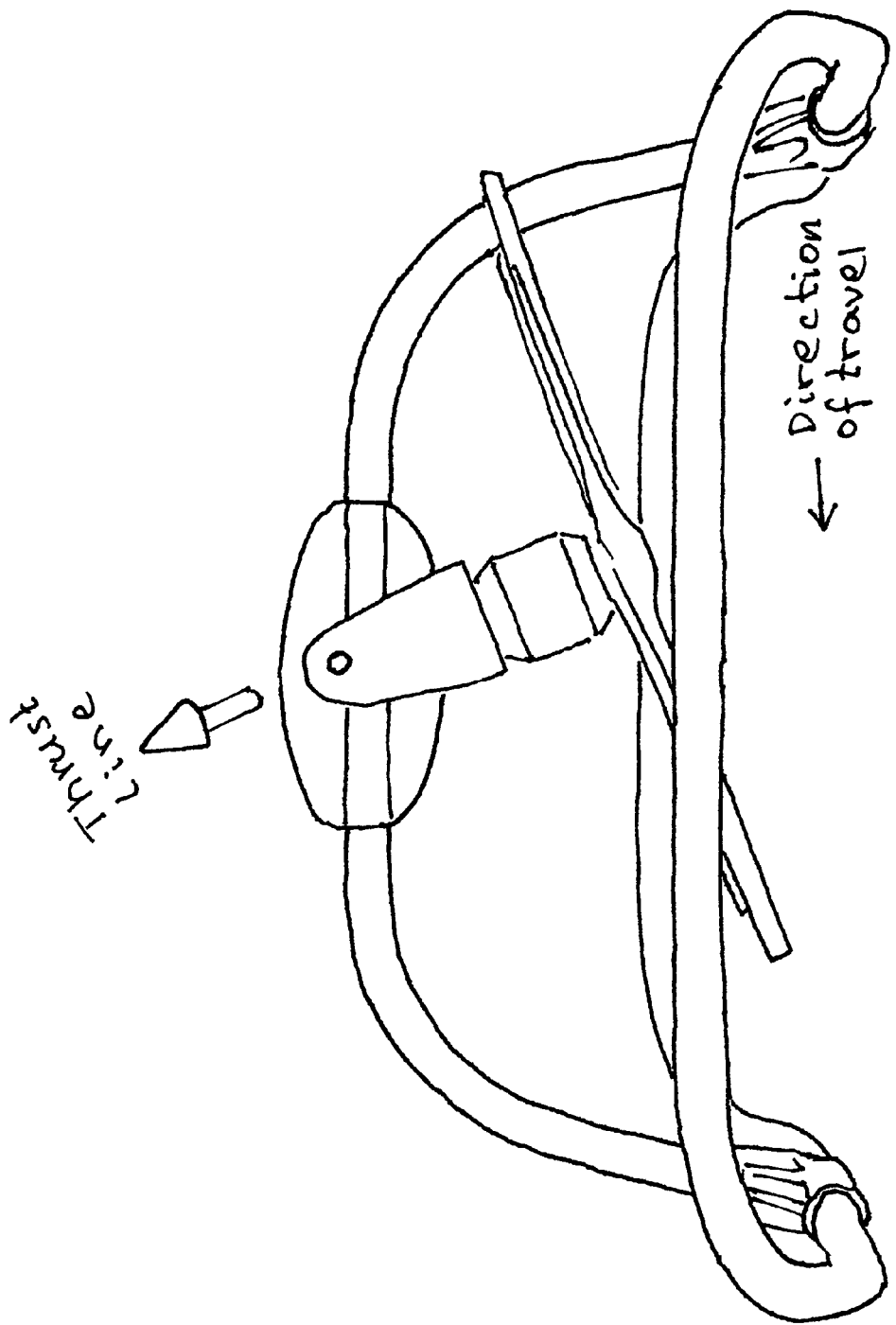
Figure 7:
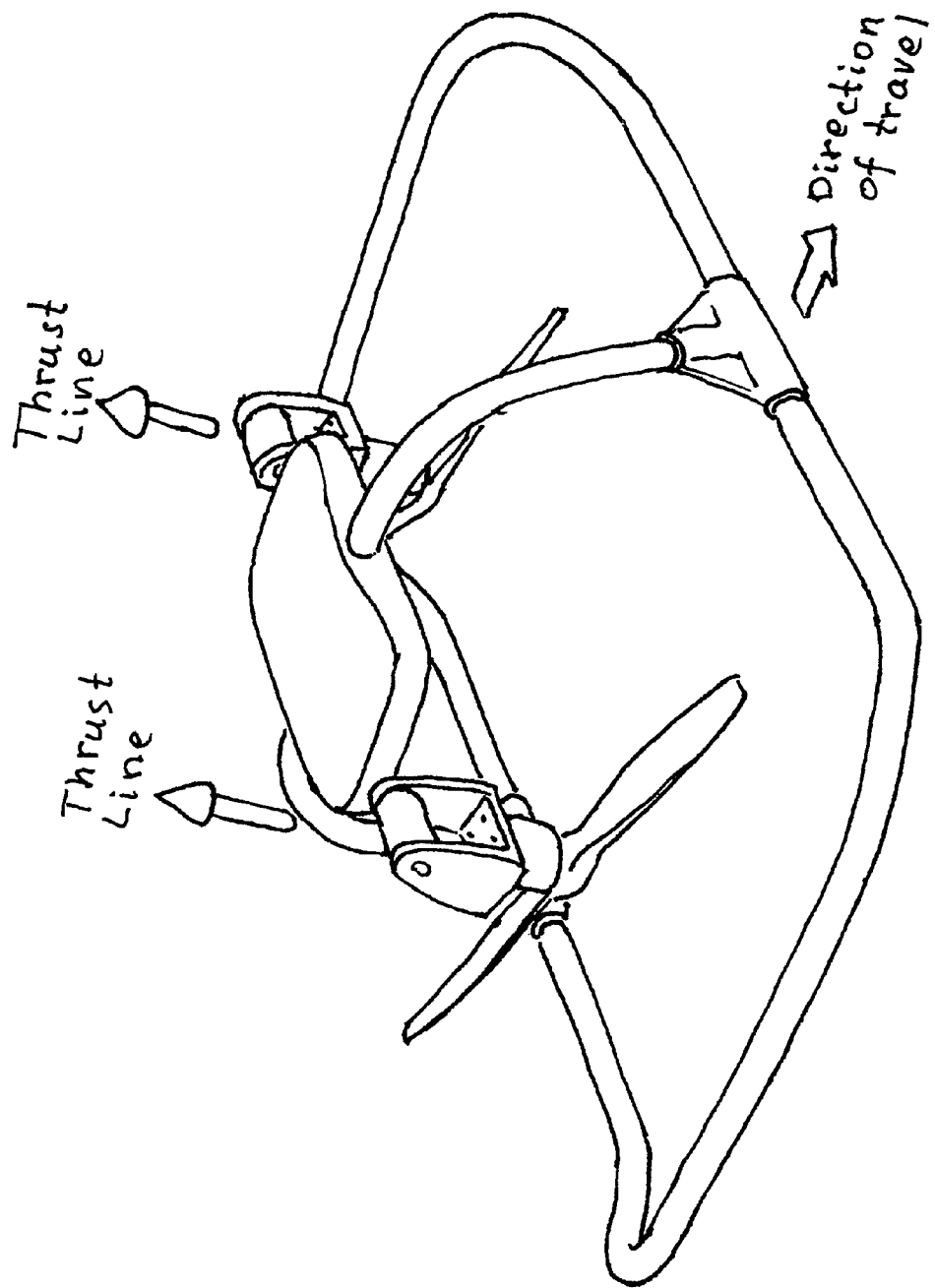
FIGS. 7 and 8 show both engine assemblies tilted around the longitudinal axis to the right (looking forward), resulting in a lateral force being imposed on the vehicle in the left direction.
Figure 8:
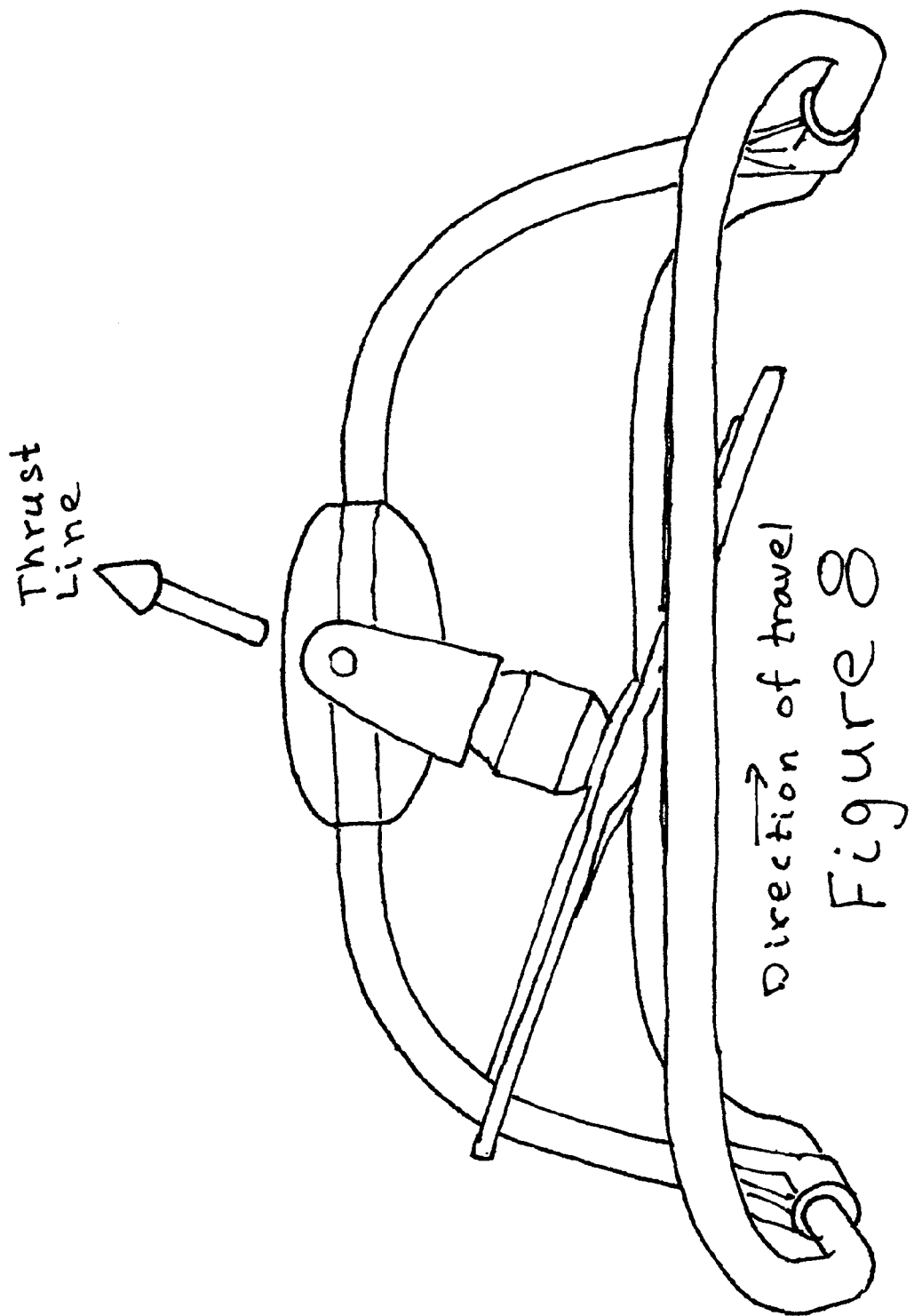
Figure 9:
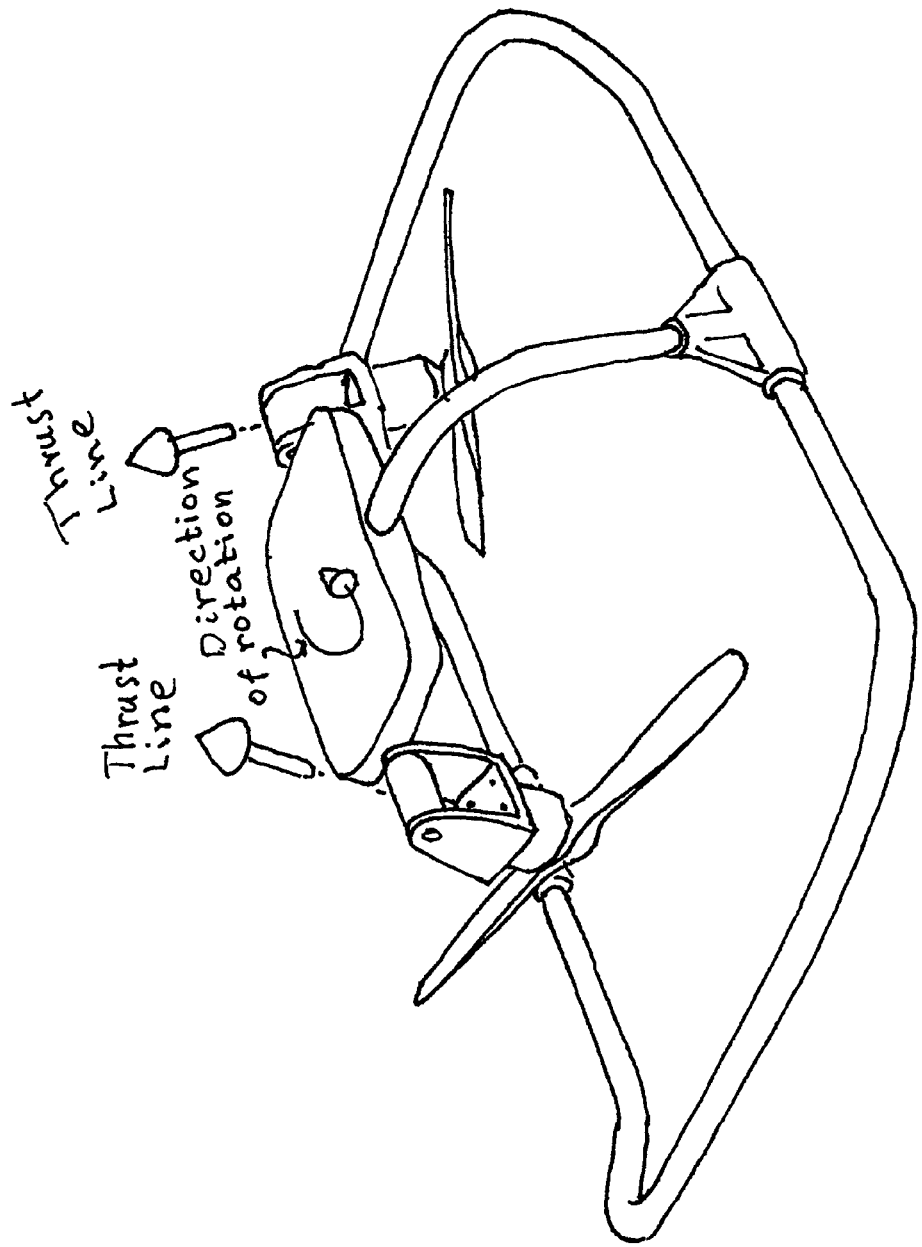
FIGS. 9 through 12 illustrate how heading can be altered by imposing a yawing moment on the vehicle. This is accomplished by tilting the two engine assemblies around the longitudinal axis in opposite directions, resulting in a change of the heading in the clockwise or counterclockwise directions.
Figure 10:
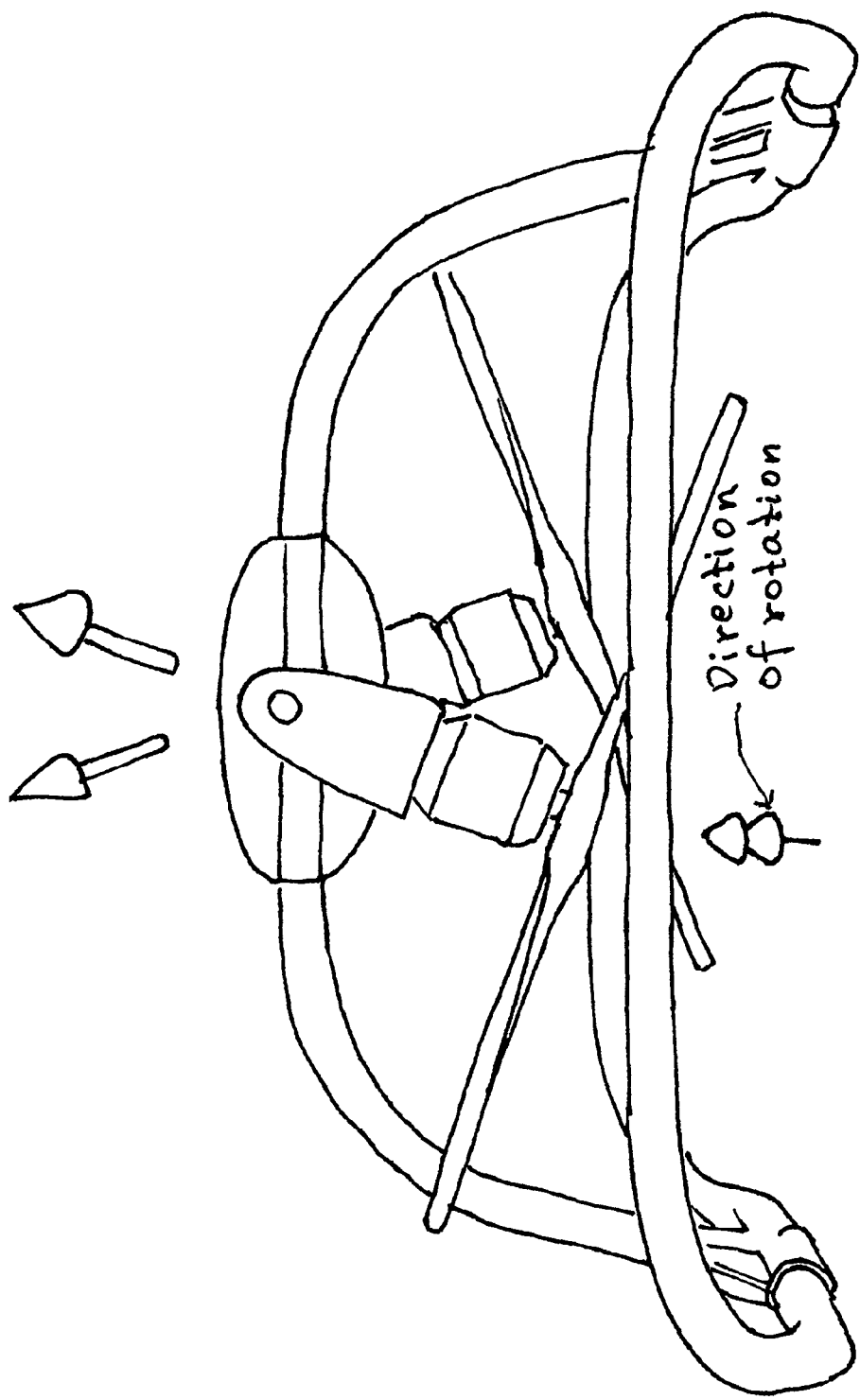
Figure 11:
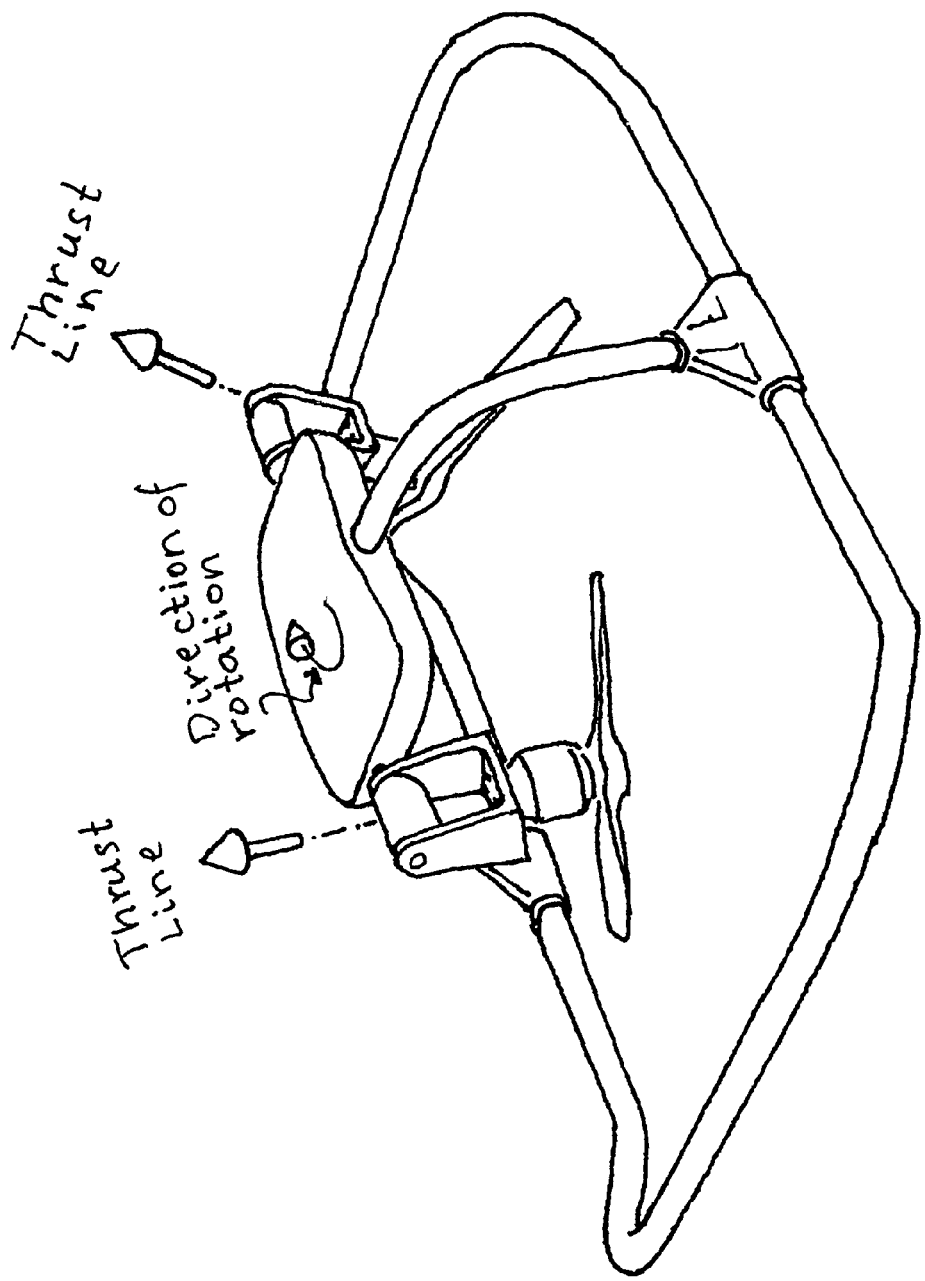
Figure 12:
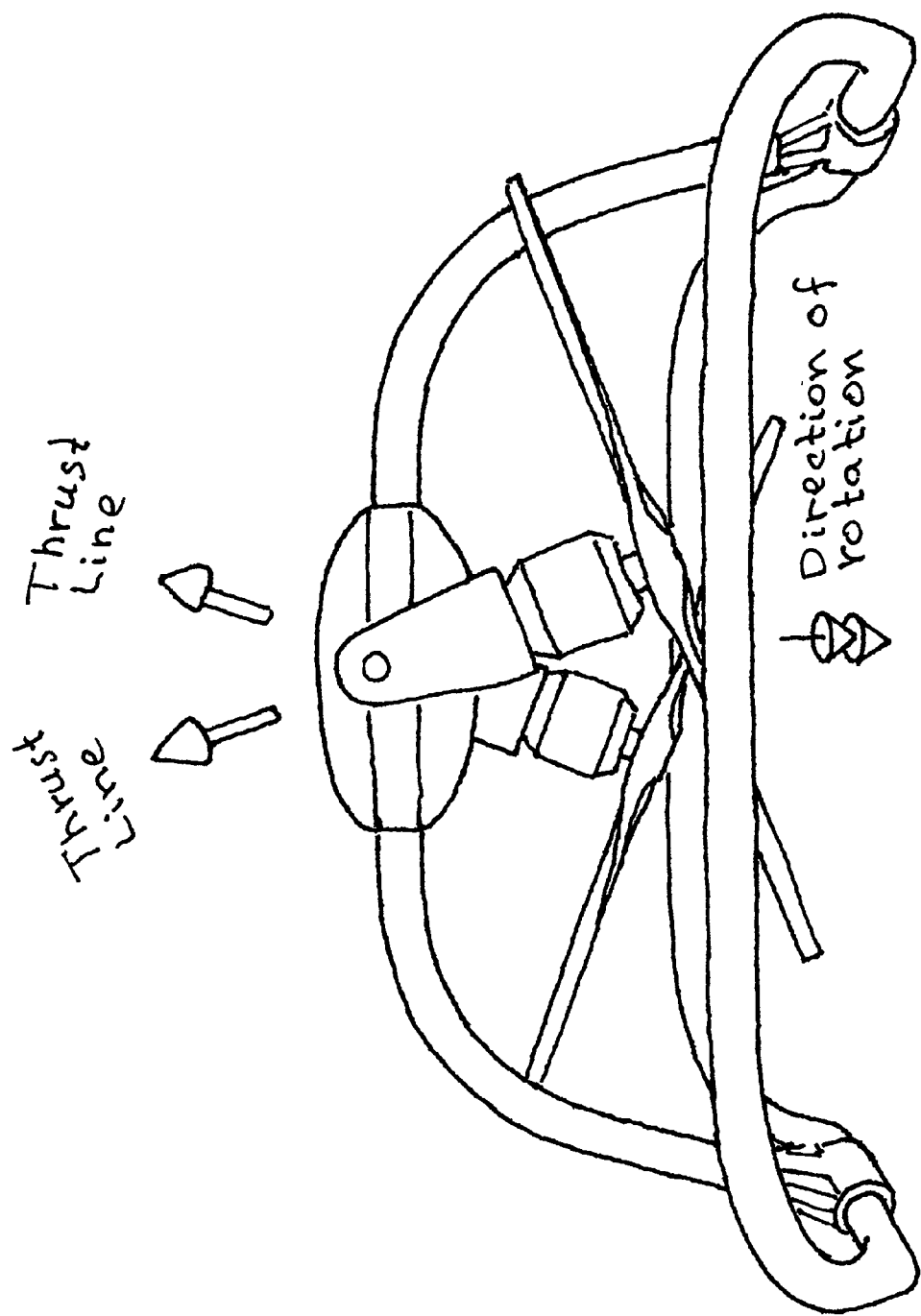
Figure 13:
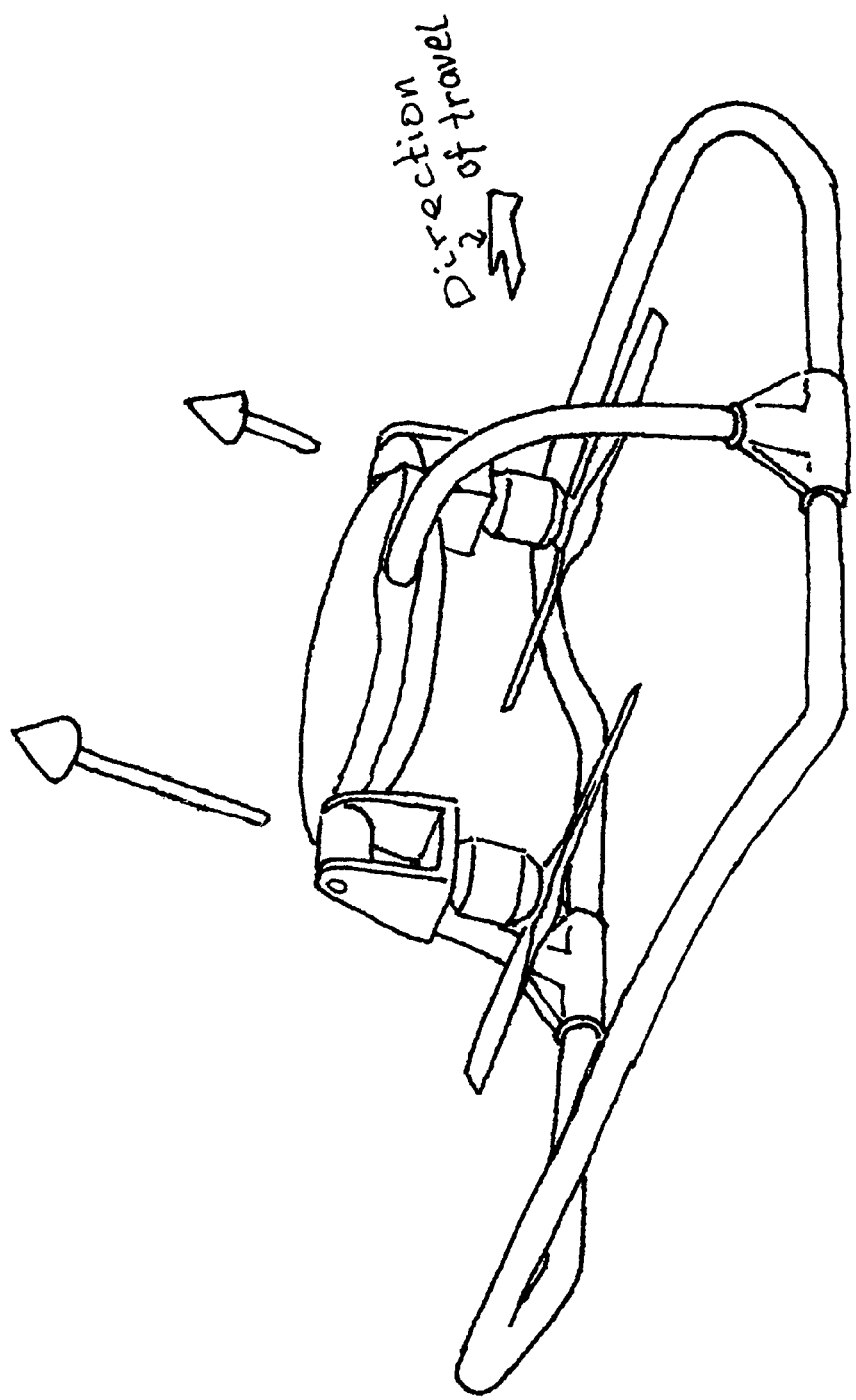
FIGS. 13 through 16 illustrate how the pitch angle can be changed by increasing the power on one of the engine assemblies, and slowing the power on the other engine. This results in a net force being applied in either the forward or aft directions, causing the vehicle to move either forward or aftward. Because this results in a net yawing moment being applied to the vehicle, since the engine with the increased power will impose a higher torque then the slowed down engine. This net torque is offset with an opposing yawing moment, introduced as described above.
Figure 14:
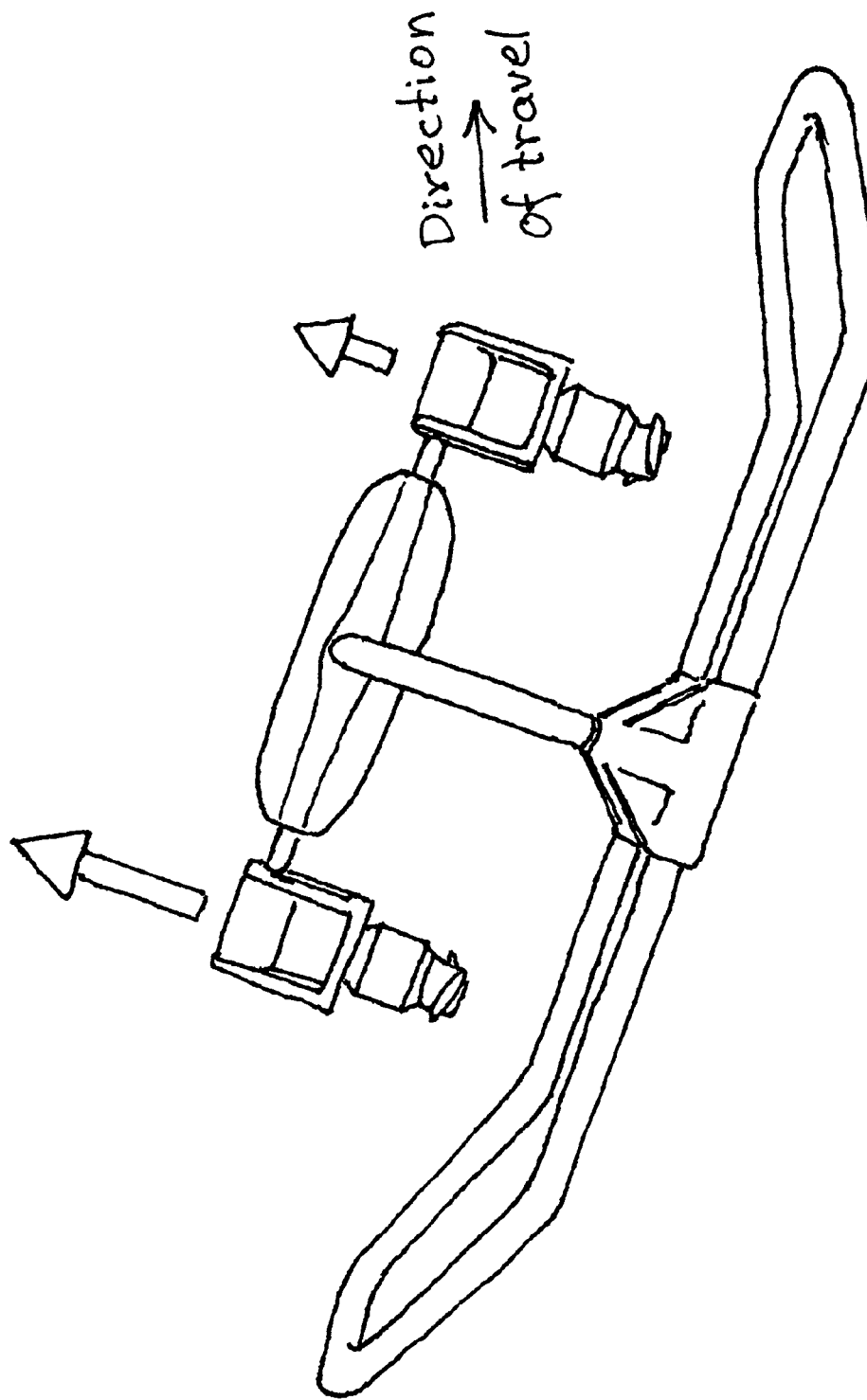
Figure 15:
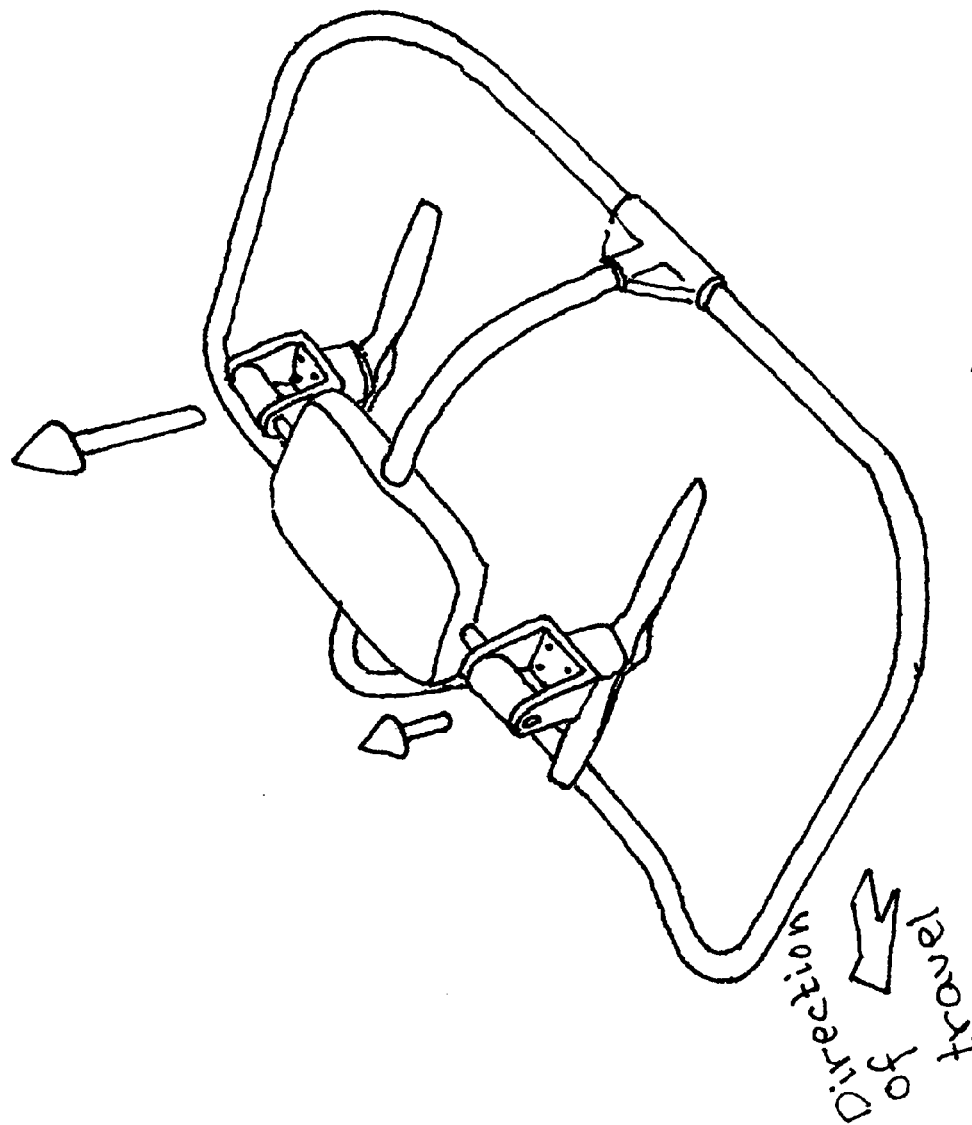
Figure 16:
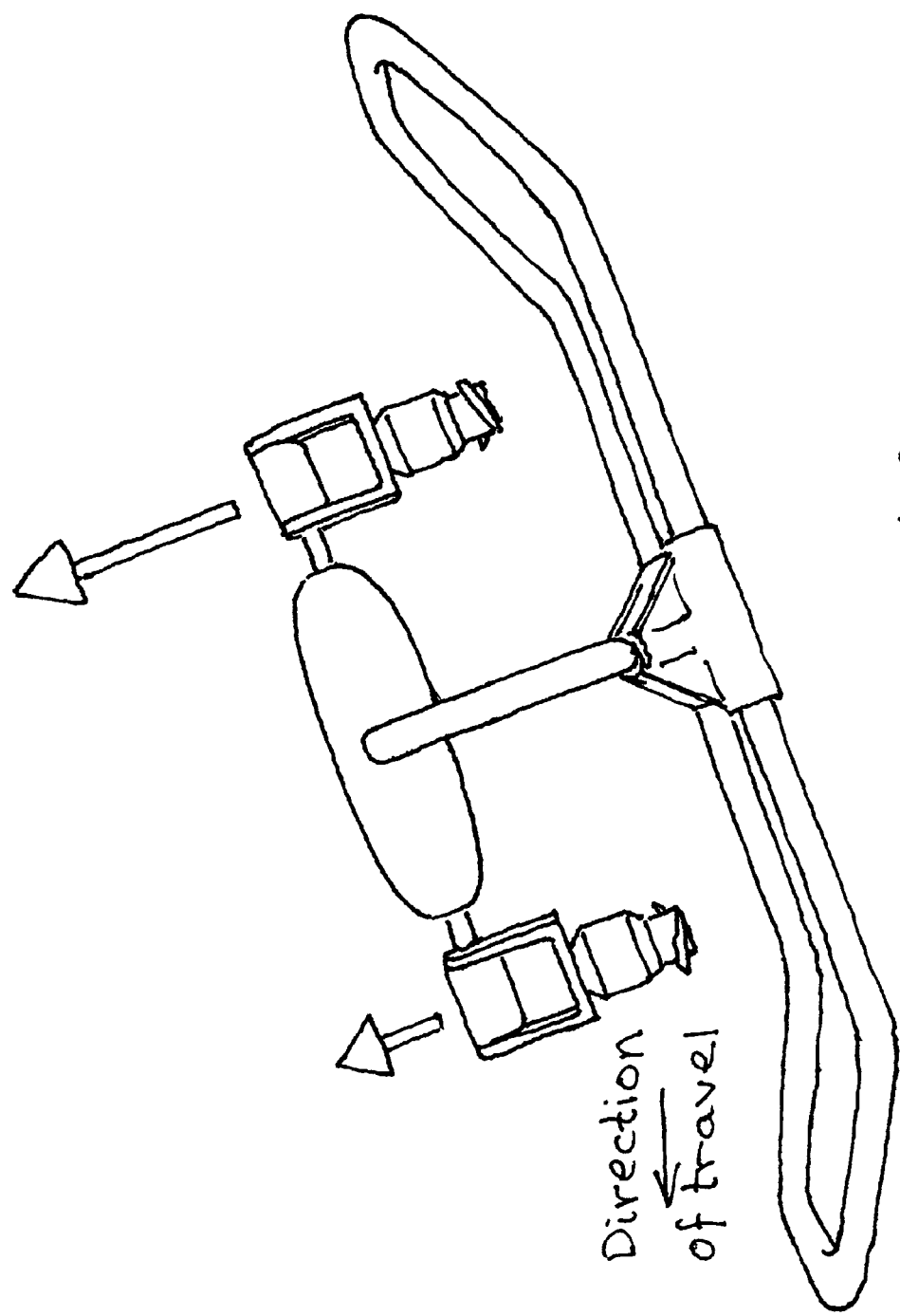

FIGS. 1 and 2 show perspective views of a Twin Propeller Attitude Control Air Vehicle (referred to generally as 100), supporting engine assemblies 102 and 103, via the longitudinally mounted shaft 104. FIGS. 3 and 4 show the same vehicle in a side and frontal view respectively.

I claim:

1. A twin engine vertical take-off and landing Air Vehicle comprising:
    a longitudinal shaft and one or more frames connecting the longitudinal shaft to a plurality of skids;
    only two counter-rotating independently controlled engines and respective propellers mounted to and below the longitudinal shaft, the respective propellers push the air downward through unobstructed area, and
    wherein the engines and respective propellers placed in tandem to allow for a narrow width of the Air Vehicle, constrained only by the reach of the propellers;
    a flight stabilization system controls a hybrid control system, the hybrid control system directly attached to the shaft without a transmission device and without a cyclic blade pitch assembly connected to the engine, and
    wherein the hybrid control system utilizes equal thrust of the two engines for vertical positioning, and
    wherein the hybrid control system utilizes unequal or differential thrust of the only two engines for fore and aft positioning;
    wherein a rotational speed of each engine and propeller assembly is independently controlled increasingly and decreasingly, resulting in the Air Vehicle tilting around the lateral axis, with a component of the thrust pointing in the fore or aft direction, causing the Air Vehicle to move in the fore or aft direction; and
    wherein the hybrid control system utilizes thrust vectoring for a lateral positioning around yaw axis and heading control, and
    wherein each engine and propeller assembly tilts around the longitudinal axis in the same direction, with a net component of the thrust pointing in the lateral direction, causing the Air Vehicle to move either to the left or to the right, and
    wherein each engine and propeller assembly tilts around the longitudinal axis in opposite directions, creating a yawing moment, resulting in heading control of the Air Vehicle;
    an automatic feedback control mechanism for stabilizing hover and flight characteristics of the Air Vehicle; and
    wherein in hover mode, loss of one or both engines will trigger the launch of a parachute, in order to provide a survivable descent.

2. The Air Vehicle of claim 1, further comprising:
    flight controls for controlling the Air Vehicle position and heading.

3. The Air Vehicle of claim 1, wherein the engines are internal combustion engines.

4. The Air Vehicle of claim 1, wherein the engines are electric motors.

5. The Air Vehicle of claim 1, wherein the Air Vehicle further comprises a radio control receiver for receiving control signals from a remote control unit.

* * * * *